(12) United States Patent
Wang et al.

(10) Patent No.: US 7,283,539 B2
(45) Date of Patent: Oct. 16, 2007

(54) METHOD AND SYSTEM FOR MANAGING MESSAGE-BASED APPLICATIONS AND APPLICATIONS PROVIDERS IN A COMMUNICATIONS NETWORK

(75) Inventors: Jiwei R. Wang, Kanata (CA); Vincent Kadar, Dunrobin (CA); Adam Cooper, Ottawa (CA); Eric Feeley, Ottawa (CA)

(73) Assignee: Airwide Solutions Inc., Kanata (CA)

( * ) Notice: Subject to any disclaimer, the term of this patent is extended or adjusted under 35 U.S.C. 154(b) by 1115 days.

(21) Appl. No.: 10/164,605

(22) Filed: Jun. 10, 2002

(65) Prior Publication Data

US 2003/0227894 A1    Dec. 11, 2003

(51) Int. Cl.
*H04L 12/28* (2006.01)
*H04Q 7/00* (2006.01)

(52) U.S. Cl. .................... 370/401; 370/328
(58) Field of Classification Search ......... 370/401, 370/328
See application file for complete search history.

(56) References Cited

U.S. PATENT DOCUMENTS

| | | | | |
|---|---|---|---|---|
| 5,329,578 A | | 7/1994 | Brennan et al. | 379/67 |
| 5,577,103 A | | 11/1996 | Foti | 379/59 |
| 5,650,994 A | * | 7/1997 | Daley | 370/259 |
| 5,740,075 A | * | 4/1998 | Bigham et al. | 709/229 |
| 5,748,493 A | * | 5/1998 | Lightfoot et al. | 709/227 |
| 6,263,064 B1 | | 7/2001 | O'Neal et al. | 379/201 |
| 6,263,212 B1 | | 7/2001 | Ross et al. | 455/466 |
| 6,289,223 B1 | | 9/2001 | Mukherjee et al. | 455/466 |
| 2002/0019243 A1 | | 2/2002 | Zhang et al. | 455/466 |
| 2002/0188688 A1 | * | 12/2002 | Bice et al. | 709/206 |
| 2004/0153511 A1 | * | 8/2004 | Maynard et al. | 709/206 |

FOREIGN PATENT DOCUMENTS

| | | |
|---|---|---|
| EP | 1 073 243 | 1/2001 |
| EP | 1 182 845 | 2/2002 |
| WO | WO 97/41654 | 11/1997 |
| WO | WO 01/77842 | 10/2001 |

* cited by examiner

*Primary Examiner*—Steven Nguyen
(74) *Attorney, Agent, or Firm*—Vincent Patent Agency

(57) ABSTRACT

A system for a network operator to manage a message-based application, provided to a subscriber, and an application provider, providing said application, in a communications network connected to a message gateway for relaying and translating messages between the application and the subscriber. The system comprising: a subscription management module for managing publication of the application and subscription to the application by the subscriber; an application management module for managing the availability of the application based on authorization by the network operator and the application provider; and a message handler module for managing relaying, translating and enhancing, with value-added information, of the messages via the message gateway based on information from the subscription management module and the application management module.

10 Claims, 6 Drawing Sheets

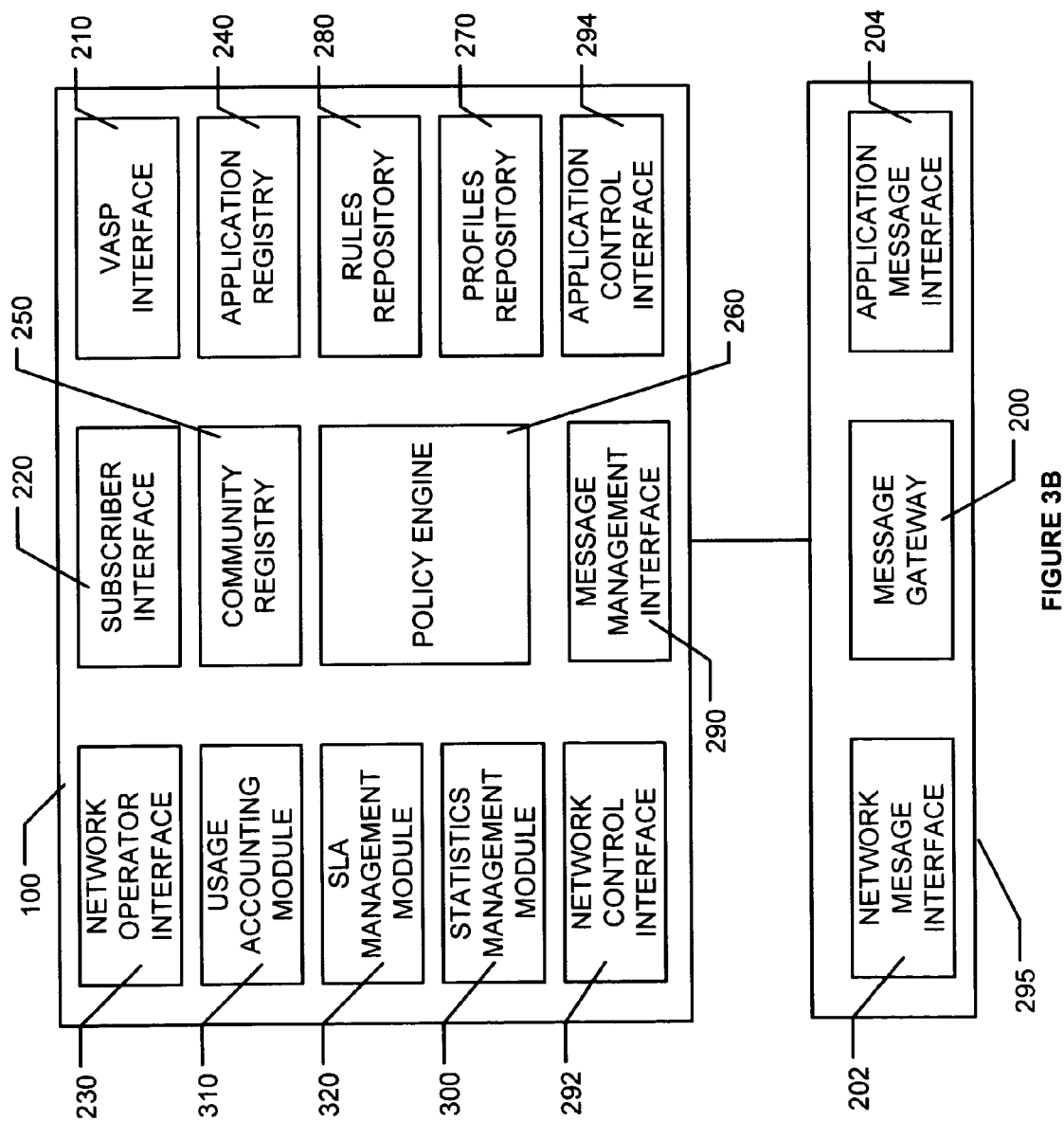

METHOD AND SYSTEM FOR MANAGING MESSAGE-BASED APPLICATIONS AND APPLICATIONS PROVIDERS IN A COMMUNICATIONS NETWORK

FIELD OF INVENTION

The present invention relates to the management of applications providers and of the applications provided to users of a communications network. More specifically to a system and method for automating the administration of applications provided by Value Added Service Providers to subscribers in a communications network.

BACKGROUND

With the introduction of messaging capability (e.g. Short Message Service (SMS)) into many digital wireless (a.k.a. mobile) communications networks as welt as some Public Switched Telephone Networks (PSTN), a new vehicle for application delivery has been created. Applications based on this messaging infrastructure are being developed and deployed in numerous communication networks. In an effort to maximize the number of applications available to their subscribers, network operators are embracing third party providers of these applications know as Value Added Service Providers (VASP). As the number of VASP and their services in a given communication network increases so too does the management and administration challenge of the network operator. On one hand, the network operators need to provide this management and administration of the VASP and applications both to ensure that their subscribers have a positive experience using the applications and also to ensure the security and stability of their networks. On tie other hand, the operators also need to make the offering of applications attractive to the VASP as they represent an additional source of revenue for the operators. The challenge for the network operators, in the absence of an automated system to administer the VASP and their applications, is to manage the increasingly large numbers of VASP and applications which will be active in the operators' network.

SUMMARY OF INVENTION

In accordance with one aspect of the present invention, a system for a network operator to manage a message-based application, provided to a subscriber, and an application provider, providing said application, in a communications network connected to a message gateway for relaying and translating messages between said application and said subscriber comprising: a subscription management module for managing publication of said application and subscription to said application by said subscriber; an application management module for managing the availability of said application based on authorization by said network operator and said application provider, and a message handler module for managing relaying and translating of said messages via the message gateway based on information from said subscription management module and said application management module.

In accordance with another aspect of the present invention, a method for a network operator to manage a message-based application, provided to a subscriber, and an application provider, providing said application, in a communications network connected to a message gateway for relaying and translating messages between said application and said subscriber comprising the steps: managing publication of said application and subscription to said application by said subscriber; managing the availability of said application based on authorization by said network operator and said application provider; and managing relaying and translating of said messages via the message gateway based on information from said subscription management module and said application management module.

In accordance with yet another aspect of the present invention, a computer program product for use by a network operator to manage a message-based application, provided to a subscriber, and an application provider, providing said application, in a communications network connected to a message gateway for relaying and translating messages between said application and said subscriber, the computer program product comprising computer readable program code devices for: managing of publication of said application and subscription to said application by said subscriber; managing of the availability of said application based on authorization by said network operator and said application provider; and managing of relaying and translating of said messages via the message gateway based on information from said subscription management module and said application management module.

In accordance with still yet another aspect of the present invention, a system for a network operator to manage a message-based application, provided to a subscriber, and an application provider, providing said application, in a communications network connected to a message gateway for relaying and translating messages between said application and said subscriber comprising: means for publishing of said application and subscribing to said application by said subscriber; means for administering the availability of said application based on authorization by said network operator and said application provider; and means for controlling the relaying and translating of said messages via the message gateway based on information from said means for publishing and subscribing and said means for administering the availability of said application.

Other aspects and features of the present invention will become apparent to those ordinarily skilled in the art upon review of the following description of specific embodiments of the invention in conjunction with the accompanying figures.

BRIEF DESCRIPTION OF DRAWINGS

The present invention will be described in conjunction with the drawings in which.

DETAILED DESCRIPTION

Figure 2:
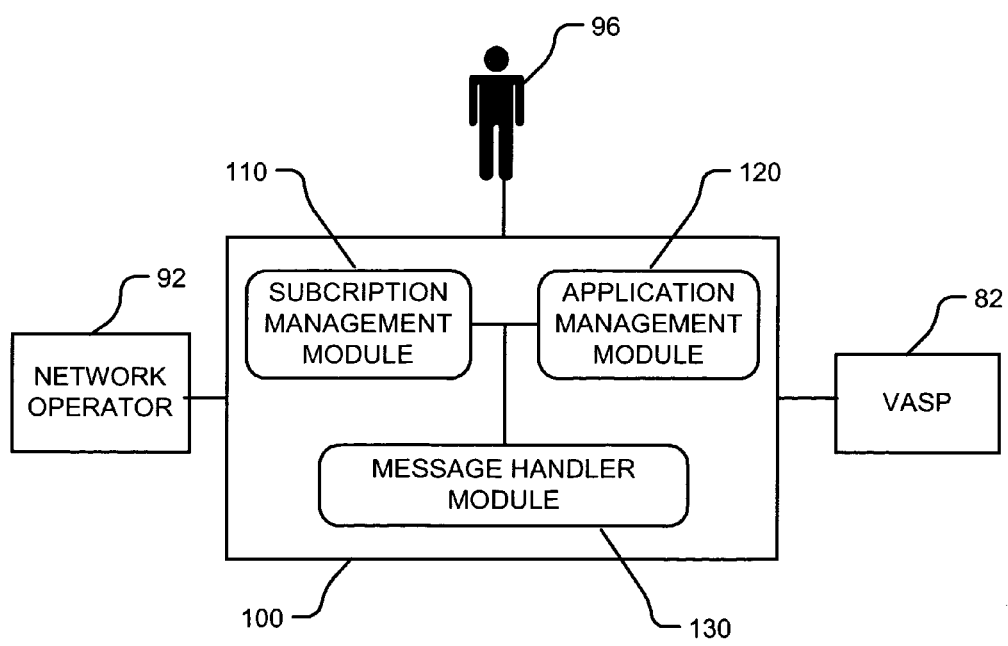
FIG. 2 is a functional representation of an embodiment of the system of the present invention and of the parties that interact with the system.

FIG. 2 illustrates the parties that interact with an Application Management System (AMS) 100 of an embodiment of the present invention. These parties are also the primary players involved in the delivery and use of message-based applications in a wireless communications network, they are: the network operator (NO) 92, the Value Added Service Provide (VASP) (a.k.a. the application provider) 82 and the terminal user (subscriber) 96.

Figure 1:
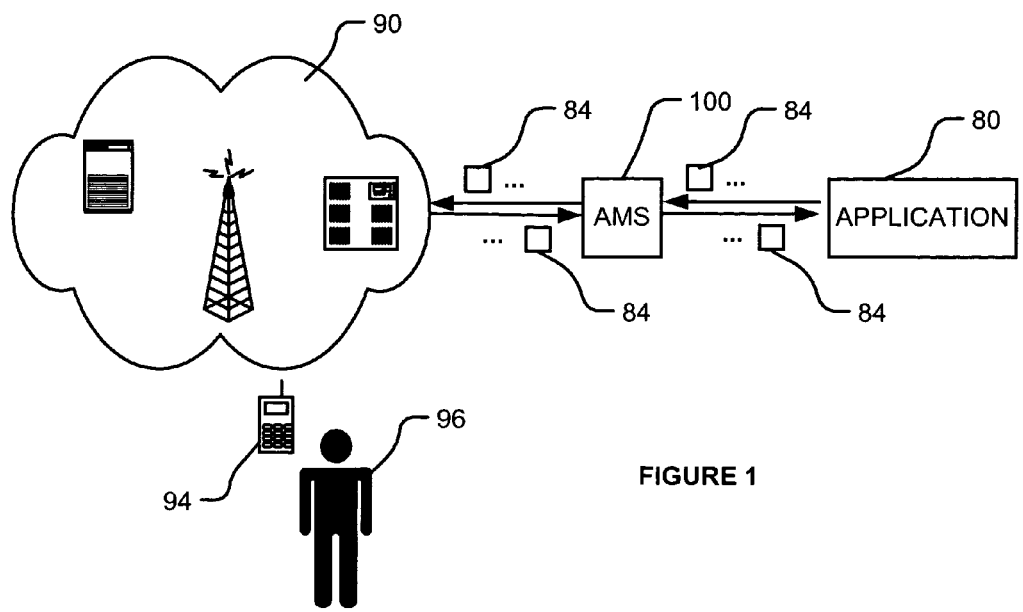
FIG. 1 represents an exemplary environment in which the system of the present invention can be deployed.

Referring now to FIG. 1 which represents an exemplary environment 50 in which the AMS 100 of the present invention can be deployed. The NO 92 provides the varied network infrastructure needed in a network 90 to enable messages 84 to be sent and received between the network 90 and a terminal 94. The subscriber 96 can send/receive messages 84 to/from other subscribers in the network 90 or other parties outside of the network 90 using the terminal 94. The network 90 infrastructure can include radio systems and antenna, mobility and telecommunications switches, mobility management systems such as home location registers (HLR), visiting location registers (VLR), roaming servers, location servers, pre-paid billing systems, authentication/authorization/accounting systems (AAA) and other similar systems.

The VASP 82 provides an application 80 which is used by the subscriber 96. The application 80 can provide services such as personalized content, streaming media, games or other similar services. Application 80 delivery takes the form of messages 84 being passed between the subscriber 96 and the application 80 typically running (executing) on an application server. The application 80 is connected to the network 90. Messages 84 between the subscriber 96 and the application 80 are relayed through the network 90. Individual application 80 interactions may be either 'pull' (e.g. subscriber request and server response) or 'push' (e.g. autonomous event notifications from the server). Message 84 exchanges between the application 80 and the subscriber 96 may be broadcast (one message 84 sent to multiple subscribers) or may be unicast (messages 84 sent are specific to one subscriber). Other interaction and distribution models may also be supported.

The subscriber 96 accesses the network 90 via his terminal 94 which is a device capable of sending and receiving messages 84 such as a digital cellular phone, two-way pager, wireless modem equipped personal computing device or other similar devices. The subscriber 96 can be uniquely identified by the network 90 via one or more unique identifiers associated with the subscriber's terminal 94 such as a subscriber identity module (SIN) card, mobile station integrated services digital network number (MSISDN) or other similar identifier.

The AMS 100 is used to manage the message-based application 80 offered in the network 90 as well as to manage the VASP 82 providing the application 80. The message-based application 80 uses the message 84 sending and receiving capability of the network 90 to receive service requests and information from the subscriber 96 and to send service information and content to the subscriber 96. The application 80 can be either interactive (pull) with both the subscriber 96 and the application 80 sending messages 84 to the other party or the application 80 can be event-driven (push) with the application 80 sending messages 84 based on specific trigger events (e.g. breaking news items or stock value threshold crossings) or on a scheduled basis (e.g. daily weather forecasts or horoscopes) to the subscriber.

Although the descriptions of this and other embodiments in this document refer to a single subscriber, it is clear that there can be multiple subscribers in the network interacting with the application as described for the single subscriber. Also, subscribers in multiple networks can interact with the same application. As well, the subscriber or multiple subscribers in a given network can interact with multiple applications from a single VASP or from multiple VASP.

FIG. 2 is a functional representation of an exemplary embodiment of the AMS 100 of the present invention and the players (VASP 82, network operator 92 and subscriber 96) that interact with the system 100. The AMS 100 assists the network operator 92 in handling the administration of the VASP 82 and the application 80. Amongst the functions provided by the AMS 100 are automation of the publishing of the application 80 by the VASP 82 and self-subscription to the application 80 by the subscriber 96 as well as life-cycle management of the application 80. The VASP 82 can publicize the existence and availability of the application 80 through a subscription management module 110. The subscriber 96 can indicate his willingness to be advised of the available application 80 via the subscription management module 110. The subscription management module 10 implements a "communities of interest" model. Communities of interest is a mechanism for categorizing the subscriber 96 (and in an alternative embodiment grouping the subscriber 96 with other subscribers of like interests) for the purposes of correlating the subscriber 96 (and the other subscribers) to the application 80. In an alternative embodiment multiple applications can be correlated to the subscriber(s) in a community of interest. For example the subscriber 96 could join the community 'business traveler' and thereby be offered the use of an 'Automated Banking Machine locator' application and a 'hotel reservation service' application. In other embodiments of the present invention, the communities (or their analogous counterparts) could correlate subscribers and applications for purposes other than "common interests" while still remaining within the scope and spirit of the present invention.

An application management module (AMM) 120 exists in recognition that, in general, neither the network operator 92 nor the VASP 82 is prepared to support immediate wide-scale deployment of the application 80 to all subscribers 96. A staged, progressive deployment of the application 80 is also possible. The application management module 120 controls promotion of the application 80 through a number of stages of progressively more widely available deployment (availabilities). The AMM 120 also provides for the demotion of the application 80 back to a less widely available state and for the ultimate withdrawal and removal of the application 80. In alternative embodiments the AMM could manage availability of the application for purposes other than scope of deployment while still remaining within the spirit and scope of the present invention.

A message handler module 130 provides for the relaying (forwarding) of messages 84 between the subscriber 96 and the application 80 in both directions. During the relaying, the messages may be enhanced or modified with additional information such as subscriber presence, location and roaming status according to policies (described below) set by subscriber 96, network operator 92 and VASP 82. The message handler module 130 allows the application 80 to identify the subscriber 96 by a simple application subscriber identifier (ASID). The message handler module 130 translates the ASID into the identifier (SNID) required by the network operator 90. The identifier translation permits the SNID to be unknown to the application 80 and therefore the subscriber 96 to be anonymous with respect to the application 80. In the case of broadcast type messages 84—for example messages 84 destined for the subscriber 96 and other subscribers of the application 80—the message handler module 130 allows the application 80 to send a single message 84 to the AMS 100 which the message handler module 130 then arranges to be replicated and sent to each of the subscribers of the application 80. The message handler module 130 also provides for routing of messages 84 sent by the subscriber 96 to the application 80.

Figure 3A:
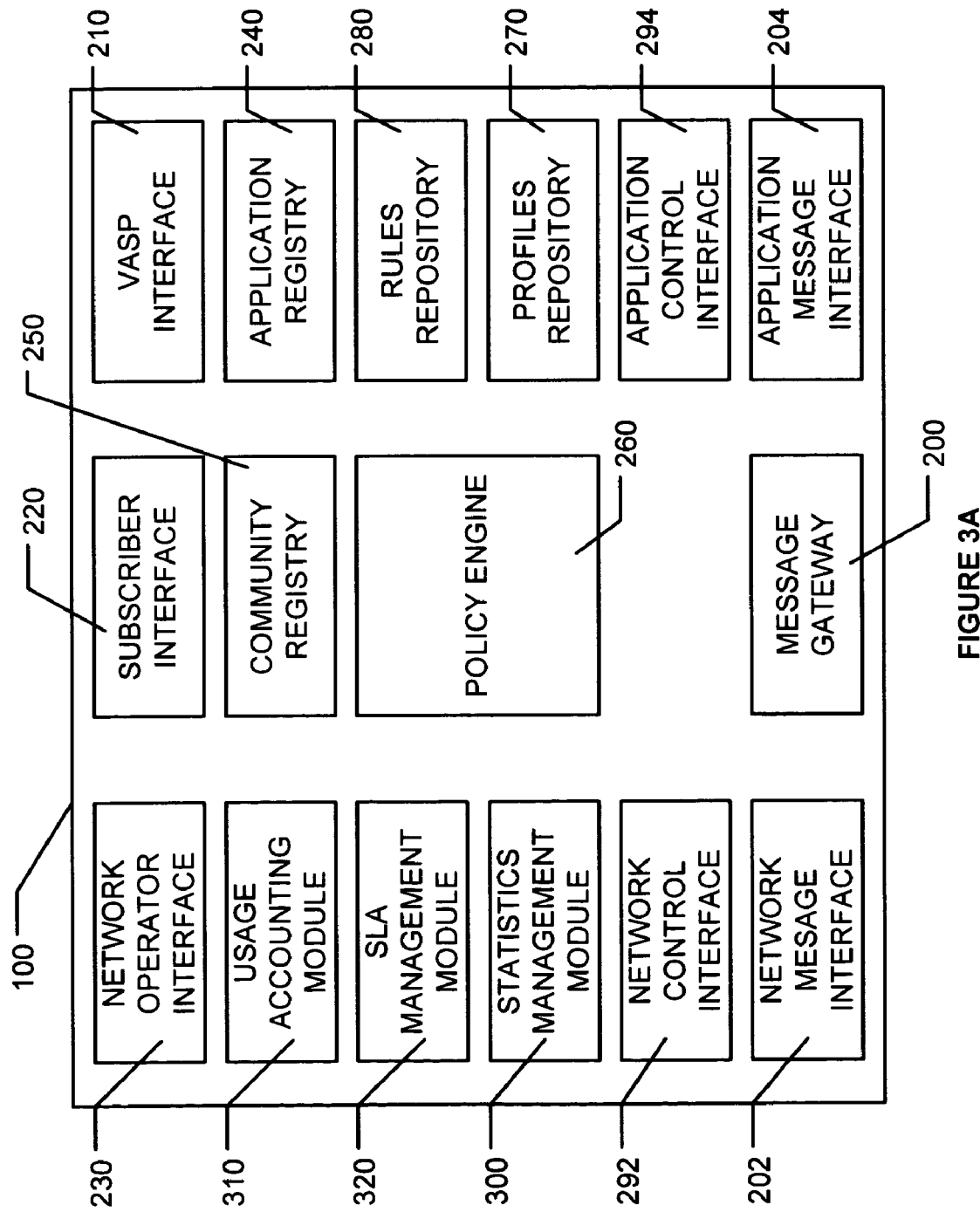
FIG. 3a & b represent the structures of alternative exemplary embodiments of the present invention.

FIG. 3*a* illustrates the major structural elements of the application management system 100 in an exemplary embodiment of the present invention. A messaging gateway 200 connects to the wireless network 90 via a network message interface 202. The network 90 in turn provides connectivity to the subscriber 96 via the wireless terminal 94. Similarly, the gateway 200 connects to the application 80 via an application message interface 204. The gateway 200, via the application message interface 204, provides the protocol support and transport mechanisms (e.g. XML over HTTP, or SMTP) to allow die application 80 to send and receive messages 84 to and from the AMS 100. Sending and receiving of messages 84 between the terminal 94 in the wireless network 90 and the AMS 100 arc enabled by protocol support and transport mechanisms (e.g. CIMD, WAP, SMTP) provided via the network message interface 202. The protocol suites supported by the application message interface 204 and the network message interface 202 are not necessarily the same. The gateway 200 provides protocol conversion (translation) between the protocols of the application 80 and the protocols of the network 90 and the subscriber terminal 94.

In an alternative embodiment represented in FIG. 3*b*, the messaging gateway 200 and its associated interfaces 202, 204 are implemented by a gateway system 295 that is not part of the AMS 100 per se. The gateway system 295 implementing the messaging gateway 200 could for example be part of the network 90 infrastructure. In this embodiment an additional interface, a messaging management interface 290, in the ALMS 100 provides the mechanism for communicating information and control instructions between the gateway system 295 (including the messaging gateway 200 and the associated interfaces 202, 204) and the other elements of the AMS 100.

Referring to FIGS. 3*a* and 3*b*, interfaces are provided to allow the principal interested parties (network operator 92, subscribers 96 and VASP 82) to interact with the AMS 100. A VASP interface 210 and a subscriber interface 220 provide the VASP 82 and subscriber 96 respectively self-administration capability which relieves the network operator 92 from having to staff these tasks. The VASP interface 210 is used by the VASP 82 to connect to the AMS 1100 to carry-out self-administration functions. These functions include the modifying the VASP's 82 profile, add/modify/remove policies specific to the application 80 deployed by the VASP 82, managing the availability of the application 80, discovering communities of interest to which the VASP 82 is allowed to add the application 80 and creating communities of interest and control which subscribers (including the subscriber 96) can join them. The VASP's 82 policies are applied to application 80 availability (e.g. scheduling and throughput), billing for application 80 use and controlling access to the VASP's 82 communities. Deployment of the application 80 is carried out within the application management module 120 (details provided below). The VASP interface 210 can take the form of a programmatic interface for machine to machine interaction and/or as a Web interface for machine to human interaction via a data connection and a data terminal or other similar interfaces. In alternative embodiments which include multiple applications, the features and capabilities described above for the application 80 apply to each of the multiple applications.

The subscriber interface 220 is used by the subscriber 96 to connect to the AMS 100 and to carry-out self-administration functions. These functions include modifying the subscriber's 96 profile, add/modify/remove subscription to the application 80 (including associated polices), join/leave communities of interest (details with respect to communities provided below), discover communities the subscriber 96 is allowed to join, discover which applications (including the application 80) are published to a particular community, and add/modify/remove polices. The subscriber's 96 policies are applied to the publication of communities of interest and of the application 80 to the subscriber 96 as well as to requests from the application 80 for information pertaining to the subscriber 96 This type of subscriber 96 information includes: presence (availability), location, roaming, pre-paid status, identity/anonymity, terminal type, security and other similar types of information that characterize the subscriber 96 and his current status. The subscriber interface 220 can take the form of a Web interface for machine to human interaction via a data connection and a data terminal and/or a Wireless interface for machine to human interaction via a wireless connection and a wireless terminal or other similar interfaces.

In alternative embodiments which include multiple subscribers, the features and capabilities described above for the subscriber 96 apply to each of the multiple subscribers.

An operator interface 230 is used by the network operator 92 to connect to the AMS 100 and to carry-out administration functions and to access information within the various components of the AMS 100. These functions include add/modify/delete VASP 82 profiles, add/modify/delete subscriber 84 profiles, add/modify/delete public communities of interest, add/modify/delete policies. The operator's 92 policies are applied to authorize access to public communities of interest, to enforcement of service level agreement (SLA) thresholds (e.g. message throughput rates, guaranteed delivery and other similar parameters) and to message 84 throttling and load-balancing. The operator can also perform functions specified in the subscriber and VASP interfaces 220,210 on behalf of the subscriber 96 and VASP 82. The operator interface 230 can take the form of a programmatic interface for machine to machine interaction and/or as a Web interface for machine to human interaction via a data connection and a data terminal or other similar interfaces. In alternative embodiments with multiple VASP and/or multiple subscribers, the features and capabilities described above for the VASP 82 and the subscriber 84 apply to each of the multiple VASP and multiple subscribers respectively.

A network control interface 292 connects the AMS 100 to the infrastructure of the communications network 90 for exchanges other than the relaying of messages 84 such as requesting and receiving network information pertaining to the subscriber 96. The network information includes various parameters that characterize the subscriber's 96 current situation with respect to the network 90 such as location, roaming status, prepaid billing status, device capability and other similar information. Network information is accessed via the network 90 from systems such as a roaming server, location server, pre-paid billing system, AAA system and other similar well known network 90 systems.

An application control interface 294 connects the AMS 100 to the application 80 for the exchange of data (information) other than applications messages 84. The application 80 can, for example, request information pertaining to the characteristics and current status of the subscriber 96 for the purposes of personalizing or adapting the application 80 interaction with the subscriber 96. The AMS 100 can, for example, obtain this information from the subscriber 96 profile or in the form of network information accessed via the network control interface 292 and provide it, the subscriber's 96 policies permitting, to the application 80.

An application registry 240 provides a persistent repository for information about application 80 availability, status within the application management module 120 and subscriptions to the application 80. A community registry 250 provides a persistent repository for recording the existence of, and participation in, communities of interest. The community registry 250 is based on a 'community of interest' model where only applications that are relevant to the community are publicized to participants of a given community. The model provides for two types of communities—public and private. Public communities are created and managed by the operator 92. Only applications which are in operator authorized states can be offered within a public community. Subscriber membership in public communities can be restricted based on operator 92 policies, e.g. subscriber's 96 service package and home location. Private communities are created by the VASP 82. Applications in non-'operator 92 authorized' states can be offered within private communities. Subscriber membership in private communities can be restricted by the VASP 82.

A statistic management module 300 collects and stores information characterizing the demand for and utilization of the application 80. This information is stored in a persistent repository and is available. To other elements of the AMS 100. Information collected can include, for example, number of services requests, number of messages 84 sent, number of messages 84 successfully delivered, number of failed requests and other similar measures.

A usage accounting module 310 collects and stores information pertaining to the use (consumption) of the application 80 by the subscriber 96. Measurement of application 80 consumption can be based on a number of parameters such as number of messages 84 received, number of bytes (octets) received, number of requests made, content value indicator and other similar parameters. The content value indicator can, for example, take the form of a service-type indicator associated with individual or groups of messages 84 by the application 80 or the VASP 82 The usage accounting module 310 measures the 'content-based' usage of the application 80 using the service-type indicator. Usage information can be collected at the messaging interfaces 202, 204 or alternatively within the message gateway 200. In the embodiment where the message gateway 200 is in the gateway system 295, the usage measurements can be provided via the messaging management interface 290. Usage information is accessible by other elements of the AMS 100. External systems such as subscriber billing or automated message accounting (AMA) connected to the network 90 can access the usage accounting information via the network control interface 292. Similarly other systems can access the usage information via one or more of the AMS 100 interfaces 210, 220, 230, 292, 294, 290.

A service level agreement (SLA) management module 320 enforces the application's 80 performance requirements. Performance criteria for the application 80, typically defined by the network operator 92, are stored by SLA management module 320 in the form of a SLA. A SLA typically contains criteria for maximal and minimal message throughput rate over a time period (e.g. minutes, day, month), percentage of messages delivered before specified points of time, the availability of the system and other similar criteria. Using application 80 measurements captured by the statistic management module 300, the SLA management module 320 compares actual application 80 performance to thresholds within the SLA. In the event that a SLA performance threshold is violated, the SLA management module 320 can cause the AMS 100 to take remedial action. This remedial action can include demoting the availability state of the application 80, suspending of the application 80, applying controls to application 80 messages 84 or other similar actions. (See description of the application management module 120 below for more details of available states and suspension.) Similarly, when a threshold violation abates, the SLA management module 320 can apply restorative actions to the application 80.

A policy engine 260 makes policy-based decisions for each of the interface elements 202, 204, 210, 220, 230, 290, 292, 294 which act as policy enforcement points. These policy decisions take into account information in a profile repository 270 and in a rules repository 280. The profile repository 270 contains a profile for the subscriber 96. The subscriber's 96 profile contains information specific to the subscriber 96 that is useful to the AMS 100 in adapting and personalizing interactions with the subscriber 96. For example this adaptation and personalization could take into account the subscriber's 96 preferences, terminal 94 capability and type of network 90 service offering subscribed to. The profile repository 270 also contains an application 80 profile for the application 80. The application 80 profile contains information specific to the application 80 that is useful to the AMS 100 in administering the deployment and rendering of the application 80. For example this administration could take into account the application's 80 authorization for use and service level agreement (SLA) parameters. The rules repository 280 contains the operator 92, VASP 82 and subscriber 96 policies in the form of rules that can be applied by the policy engine 260. Each rule has the form of a condition—action expression pair. When a rule is applied, the condition expression is evaluated and if the condition is met the action expression is executed. Each of the condition and action expressions can incorporate data parameters drawn from the subscriber 96 profile, the application 80 profile, the community registry 250, application registry 240, statistics management module 300, usage accounting module 310, SLA management module 320, network information, temporal information (e.g. time-of-day, day-of-week, date, etc.) and other similar sources as required. Temporal information is accessed from well known functions of a computing platform on which the AMS 100 is implemented. When policies are applied, the called for actions are implemented at the policy enforcement points. These actions can, for example, determines the acceptance and routing of messages 84 at the gateway interfaces 202, 204, allow or disallow self-administration functions at the administrative interfaces 210,220,230 and trigger or reject information and control requests at the control interfaces 290, 292, 294. In alternative embodiments which include multiple VASP, applications, subscribers and/or network operators, the features and capabilities described above apply to each of the multiple VASP, applications, subscribers and/or network operators respectively as is appropriate.

The functional modules of FIG. 2 represent logical groupings of functionality that may not be directly reflected in the structure of an embodiment of the present invention. For example, in the embodiments illustrated in FIGS. 3a and 3b the implementation of each of the functional modules of FIG. 2 can be distributed across multiple of the structural elements. This approach recognizes that the policy engine 260, for example, is well suited to apply policies that implement each of the functional modules of FIG. 2.

Figure 4:
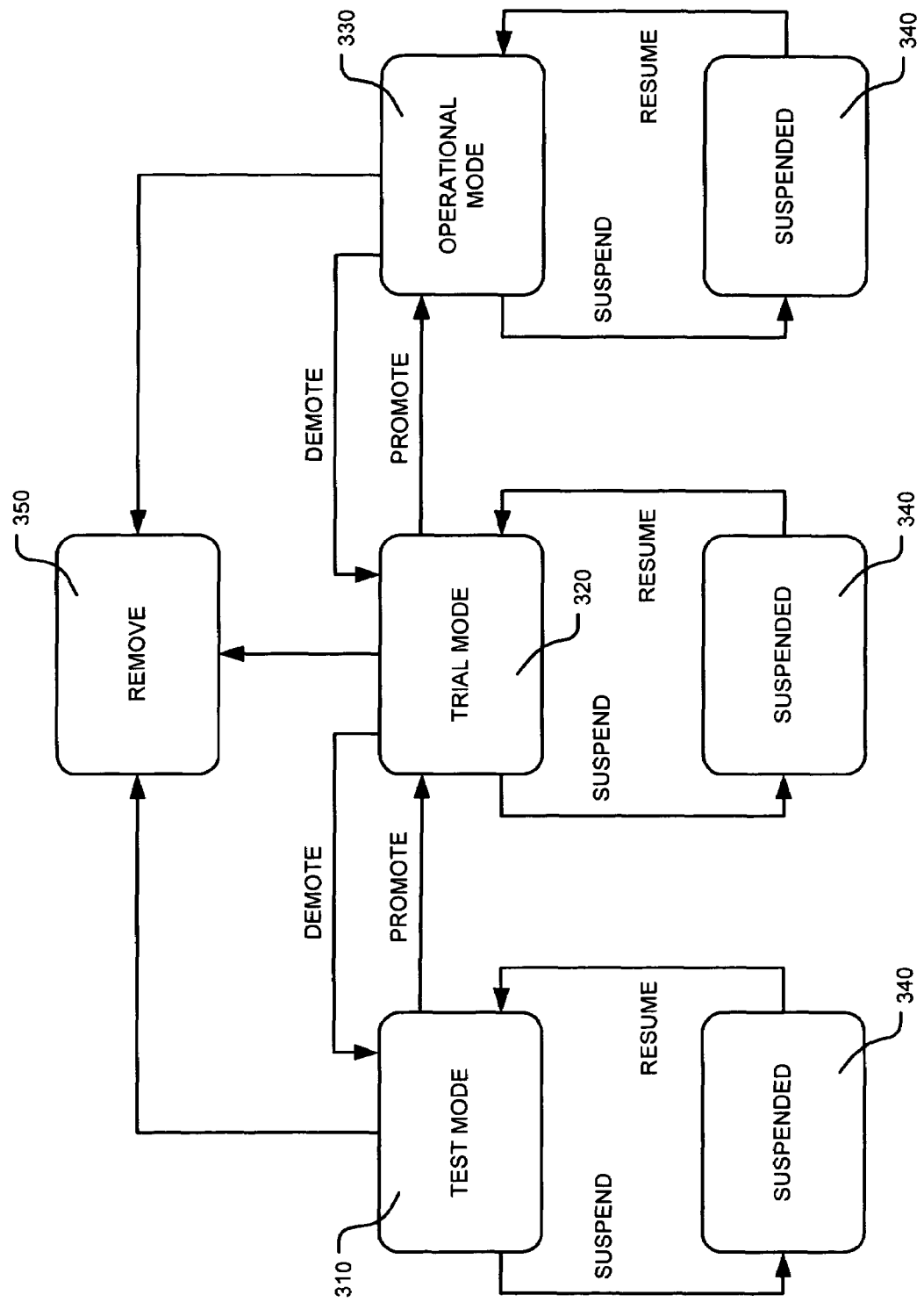
FIG. 4 represents an exemplary embodiment of the life-cycle finite state machine of the present invention.

Referring again to FIG. 2, the application management modules 120 enables the controlled addition, deployment, exploitation and withdrawal of the application 80. The application management module 120 implements and maintains a finite state machine 300 such as, for example, the one in FIG. 4, for the application 80. In the example represented in FIG. 4 the application 80 can take on any one of the states: test mode 310, trial mode 320, operational mode 330, suspended 340 and removed 350.

When the application 80 is first defined in the AMS 100—by the creation of an appropriate entry in the application repository 240—the finite state machine 300 for the application 80 is set to the test mode state 310. This state exists to give the VASP 82 the opportunity to test the application 80 without prior operator 92 intervention. This allows the operator 92 to control the environment in which the VASP 82 tests the application 80. When in test mode 310, the application 80 can only be published to a community that the VASP 82 controls (i.e. a private community.) From the test mode state 310 the application 80 transitions to the suspended state 340 when the operator 92 suspends the application 80. From the suspended state 340 the application 80 transitions back to the test mode state 310 when the operator resumes the application 80.

When the operator 92 or the VASP 82 promotes the application 80 in the test mode state 310, it transitions to the trial mode state 320. The trial mode state 320 exists to give the VASP 82 the opportunity to trial the application 80. When the operator 92 permits the application 80 to transition to the trial mode state 320 (an operator-authorized state), certain restrictions may be applied to or lifted from the application 80. For example, the application 80 in trial mode 320 may not be permitted to generate subscriber 96 charges—i.e. the service would be free. The application 80 in trial mode 320 can be published to VASP 82 controlled (private) and to operator 92 controlled (public) communities. In the trial mode state 320, the application 80 transitions back to the test mode state 310 when the operator 92 demotes the application 80. The application 80 in the trial mode state 320 transitions to and from the suspended state 340 when suspended and resumed as described for the test mode state 310.

When the operator 92 promotes the application 80 in the trial mode state 320, the application 80 transitions to the operational mode state 330 (an operator-authorized state). The operational mode state 330 is state in which the application 80 has generally unrestricted operational capability. The application 80 in operational mode 330 can be published to VASP 82 controlled and to operator 92 controlled communities. In the operational mode state 330, the application 80 transitions back to the trial mode state 320 when the operator 92 demotes the application 80. The application 80 in the operational mode state 340 transitions to and from the suspended state 340 when suspended and resumed as described for the test mode state 310.

Application state promotion, demotion and suspension can be based on application measurements from the statistics management module 300, by SLA threshold crossings as indicated by the SLA management module 310 or by other similar drivers. The trigger for the promotion, demotion and suspension actions can be automated or manually initiated.

In the suspend mode state 340 referenced above the application 80 is temporarily suspended from using various AMS 100 resources. For example, the application 80 is prohibited from sending and receiving messages 84. From each of the test mode 310, trial mode 320 and operational mode 330 states described above, the application 80 can transition to the removed state 350. The VASP 92 causes transitions of the application 80 to the removed state 350 when the VASP 92 wishes to withdraw (make permanently unavailable) the application 80.

Figure 6:
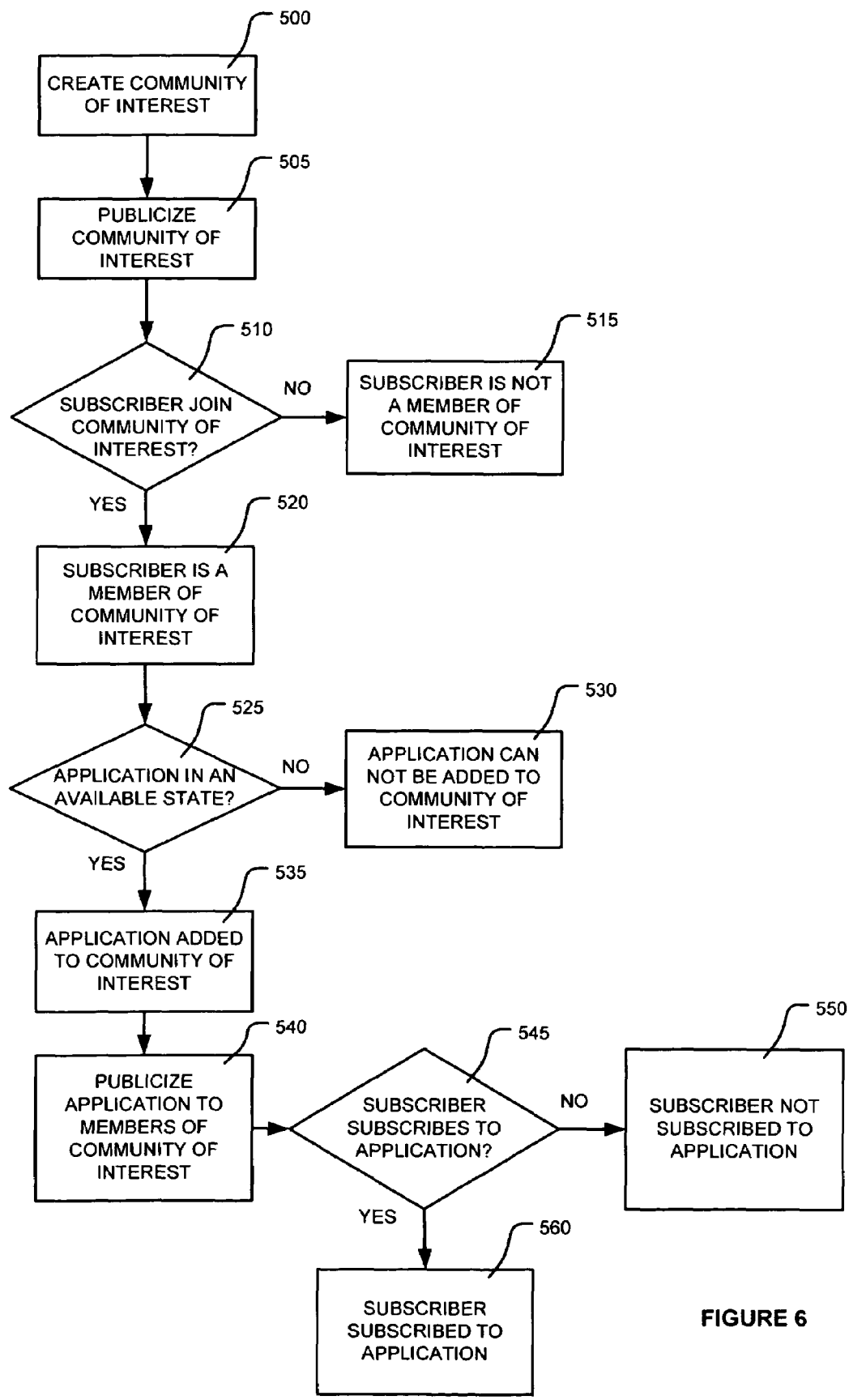
FIG. 6 represents a flowchart of a method illustrating how a subscriber subscribes to an application according to an embodiment of the present invention.

FIG. 6 is a flowchart of a method illustrating how the subscriber 96 subscribes to the application 80 according to an embodiment of the present invention A community of interest is created 500 by the VASP 82 or by the network operator 92 as described in the section on the application management module 120. The subscriber 96 becomes aware of the existence of a community 505 either by receiving a message 84 sent by the AMS 100 to advise the subscriber 96 of the existence of a community, by sending a request message 84 to the AMS 100 for a list of communities and receiving an appropriate reply message 84 or by other similar mechanisms. The subscriber 96 can choose 510 to join (become a member of) the community of interest by sending a 'join community' request message 84 to the AMS 100 or some other similar indication. Once requested, the subscriber is made a member of the community 520. Otherwise, the subscriber 96 is a non-member of the community 515 When the application 80 is in one of the states: test mode 310, trial mode 320 or operational mode 330; it is said to be in an 'available state' 525 Alien the application 80 is in an 'available state', the VASP 82 can include the application 80 in (add) a community and therefore publicize the application 80 to the members of the community 535. Otherwise, the VASP 82 can not be added to a community and therefore can not be publicized to the members of the community 530. The VASP 82 publishes the application 80 to a community of interest consistent with the privilege to do so as described in the application management module 120 section 540 The subscriber 96 being a member of the community of interest becomes aware of the published application 80 by receiving a message 84 sent by the AMS 100 to advise the subscriber 96 of the publishing of the application 80, by sending a request message 84 to the AMS 100 for a list of published applications for the community and receiving an appropriate reply message 84 or by other similar mechanisms. If the subscriber 96 chooses 545 to subscribe to the application 80, the subscriber 96 sends a 'subscribe to application' request message 84 to the AMS 100 or some other similar indication. The subscriber 96 is then subscribed to 560 the application 80 Otherwise, the subscriber 96 is a not subscribed to 550 the application 80.

When an application 80 wishes to autonomously send a message 84 to all of the subscribers of the application (broadcast to subscribers) it sends a single message 84 requesting the broadcast to the AMS 100. This message may contain conditions such as "to members of the 'Traveler' community who are in Dallas". The AMS 100, using information contained in the application registry 240, determines which subscribers 96 awe subscribed to the application 80 and provides for a copy of the application message to be sent to each of them. Using information contained in the subscriber profile, the AMS 100 can provide for adaptation of the message 84 sent to each subscriber to the subscriber's terminal 94 capability and to the protocol requirements of the network operator 92.

In the case of subscriber to application interaction initiated by the subscriber 96, a message 84 is sent by the subscriber 96 to the AMS 100 destined for the application 80. The AMS 100 provides for the adaptation of the protocol of the forwarded message 84 to the requirements of the application server and, if specified by the subscriber profile, provides an anonymity function to prevent the VASP 82 from directly knowing the identity of the subscriber 96. In the case where anonymity is provided, the AMS 100 is able to correlate a response message 84 sent by the application 80 to the originating subscriber 96 and to address and forward the respond message 84 appropriately.

Figure 5:
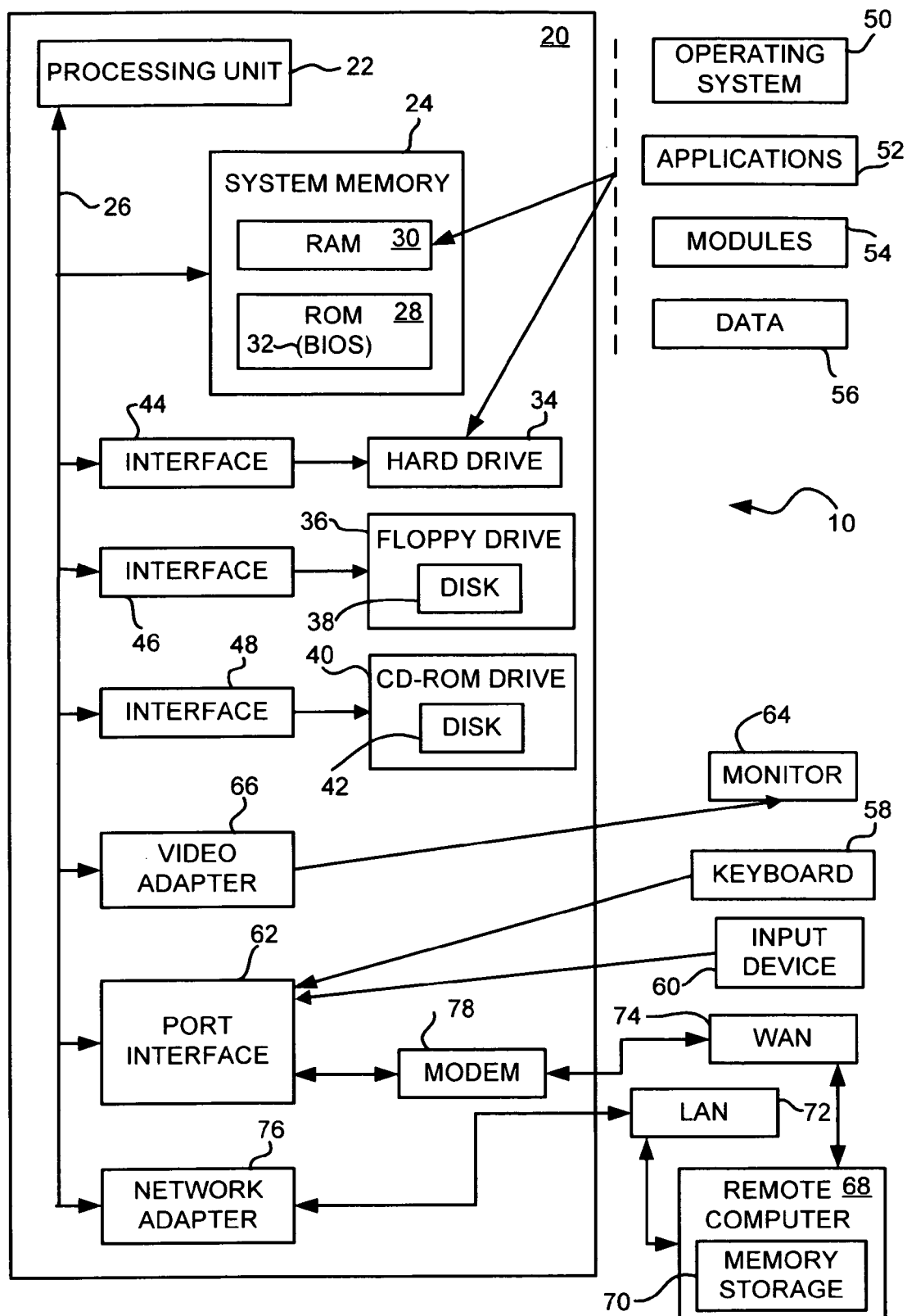
FIG. 5 represents an exemplary computing platform on which the system of the present invention can be implemented.

FIG. 5 and the associated description represent an example of a suitable computing environment in which the invention may be implemented. While the invention is described in the context of implementation in the form of computer-executable instructions of a program that runs on a conventional computing platform, the invention can also be implemented in combinations with other program modules.

Generally, program modules include routines, programs, components, data structures and the like that perform particular tasks or implement particular abstract data types. Further, the present invention can also be implemented using other computer system configurations, including handheld devices, multiprocessor systems, microprocessor-based or programmable consumer electronics, personal computers, mainframe computers and the like. The invention can also be practiced in distributed computing environments where tasks are performed by remote processing devices that are linked through a communications network. In a distributed computing environment, program modules may be located in both local and remote memory storage devices.

With reference to FIG. 5, an exemplary system 10 includes a conventional computer 20, including a processing unit 22, a system memory 24, and a system bus 26 that couples various system components including the system memory 24 to the processing unit 22. The system bus 26 includes several types of bus structures including a memory bus or memory controller, a peripheral bus, and a local bus using any of a variety of conventional bus architectures (e.g., PCI, VESA, ISA, EISA etc.)

The system memory 24 includes read only memory (ROM) 28 and random access memory (RAM) 30. A basic input/output system (BIOS) 32, containing the basic routines that help to transfer information between elements within the computer 20, such as during start-up, is stored in the ROM 28. The computer 20 also includes a hard disk drive 34, magnetic disk drive 36 (to read from and write to a removable disk 38), and an optical disk drive 40 (for reading a CD-ROM disk 42 or to read from or write to other optical media). The drives 34, 36 and 40 are connected to the system bus 26 by interfaces 44, 46 and 48, respectively.

The drives 34, 36 and 40 and their associated computer-readable media (38, 42) provide nonvolatile storage of data, data structures, and computer-executable instructions for the computer 20. The storage media of FIG. 5 are merely examples and it is known by those skilled in the art to include other types of media that are readable by a computer (e.g., magnetic cassettes, flash memory cards, digital video disks, etc.).

A number of program modules may be stored in the drives 34, 36 and 40 and the RAM 30, including an operating system 50, one or more application programs 52, other program modules 54 and program data 56. A user may enter commands and information into the computer 20 through a keyboard 58 and an input device 60 (e.g., mouse, microphone, joystick, game pad, satellite dish, scanner etc.) These devices (58 and 60) are connected to the processing unit 22 through a port interface 62 (e.g., serial port, parallel port, game port, universal serial bus (USB) etc.) that is coupled to the bus 26. A monitor 64 or other type of display device is also connected to the bus 26 through an interface 66 (e.g., video adapter).

The computer 20 may operate in a networked environment using logical connections to one or more remote computers, such as remote computer 68. The remote computer 68 may be a server, a router, a peer device or other common network node, and typically includes many or all of the elements described in relation to the computer 20, although for simplicity only a memory storage device 70 is shown. The logical connections shown in FIG. 5 include a local area network (LAN) 72 and a wide area network (WAN) 74. Such networking environments are commonly used in offices, enterprise-wide computer networks, intranets and the Internet.

When used in a LAN networking environment, the computer 20 is connected to the LAN 72 through a network interface or adapter 76. When used in the WAN networking environment, the computer 20 typically includes a modem 78 or other means for establishing communications over the WAN 74, such as the Internet. The modem 54, which may be internal or external, is connected to the bus 26 through the port interface 62 In a networked environment, program modules depicted relative to the computer 20, or portions thereof, may be stored in the remote memory storage device 70.

It will be apparent to one skilled in the art that numerous modifications and departures from the specific embodiments described herein may be made without departing from the spirit and scope of the present invention.

The invention claimed is:

1. A system for a network operator to manage a message-based application, provided to a subscriber, and an application provider, providing said application, in a communications network connected to a message gateway for relaying and translating messages between said application and said subscriber comprising:

a subscription management module for managing publication of said application and subscription to said application by said subscriber, having a mechanism for:

publicizing the existence of a community to the subscriber;

adding the subscriber as a member of the community responsive to a request for membership from the subscriber;

including the service in the community responsive to an availability state of the application;

publicizing the application to the subscriber as a member of the community; and subscribing the subscriber to the application responsive to a request to subscribe from the subscriber;

an application management module for managing the availability of said application based on authorization by said network operator and said application provider; and a message handler module for managing relaying and translating of said messages via the message gateway based on information from said subscription management module and said application management module.

2. A system for a network operator to manage a message-based application, provided to a subscriber, and an application provider, providing said application, in a communications network connected to a message gateway for relaying and translating messages between said application and said subscriber comprising:
- a subscription management module for managing publication of said application and subscription to said application by said subscriber;
- an application management module, for managing the availability of said application based on authorization by said network operator and said application provider, comprising an availability state, for said application, having a value signifying one of a range of progressively wider deployment availabilities wherein said value is selected from a first pre-determined set by the network operator and from a second pre-determined set by the application provider; and
- a message handler module for managing relaying and translating of said messages via the message gateway based on information from said subscription management module and said application management module.

3. The system of claim 2, further comprising:
- a statistics management module for gathering measurements on the demand for and utilization of said application;

wherein, said measurements are used in determining said value and in determining when to select said value.

4. The system of claim 3, further comprising:
- a service level agreement (SLA) management module for enforcing application performance requirements captured in an SLA based on said measurements.

5. A method for a network operator to manage a message-based application, provided to a subscriber, and an application provider, providing said application, in a communications network connected to a message gateway for relaying and translating messages between said application and said subscriber comprising the steps of:
- managing publication of said application and subscription to said application by said subscriber, comprising the steps of:
  - publicizing the existence of a community to the subscriber;
  - adding the subscriber as a member of the community responsive to a request for membership from the subscriber;
  - including the service in the community responsive to an availability state of the application;
  - publicizing the application to the subscriber as a member of the community; and
  - subscribing the subscriber to the application responsive to a request to subscribe from the subscriber;
- managing the availability of said application based on authorization by said network operator and said application provider; and
- managing relaying and translating of said messages via the message gateway based on information from said subscription management module and said application management module.

6. A method for a network operator to manage a message-based application, provided to a subscriber, and an application provider, providing said application, in a communications network connected to a message gateway for relaying and translating messages between said application and said subscriber comprising the steps:
- managing publication of said application and subscription to said application by said subscriber;
- managing the availability of said application based on authorization by said network operator and said application provider, comprising the step of managing an availability state, for said application, having a value signifying one of a range of progressively wider deployment availabilities wherein said value is selected from a first pre-determined set by the network operator and from a second pre-determined set by the application provider; and
- managing relaying and translating of said messages via the message gateway based on information from said subscription management module and said application management module.

7. The method of claim 6, further comprising the step of:
- gathering measurements on the demand for and utilization of said application;

wherein, said measurements being used in determining said value and in determining when to select said value.

8. A computer-readable program product for use by a network operator to manage a message-based application, provided to a subscriber, and an application provider, providing said application, in a communications network connected to a message gateway for relaying and translating messages between said application and said subscriber, the computer-readable program product comprising:
- having a stored computer program to perform, when executed by a processor, the steps of:
- managing of publication of said application and subscription to said application by said subscriber, comprising the steps of:
  - publicizing the existence of a community to the subscriber;
  - adding the subscriber as a member of the community responsive to a request for membership from the subscriber;
  - including the service in the community responsive to an availability state of the application;
  - publicizing the application to the subscriber as a member of the community; and
  - subscribing the subscriber to the application responsive to a request to subscribe from the subscriber;
- managing of the availability of said application based on authorization by said network operator and said application provider; and
- managing of relaying and translating of said messages via the message gateway based on information from said subscription management module and said application management module.

9. A computer-readable program product for use by a network operator to manage a message-based application, provided to a subscriber, and an application provider, providing said application, in a communications network connected to a message gateway for relaying and translating messages between said application and said subscriber, the computer-readable program product comprising:
- having a stored computer program to perform, when executed by a processor, the steps of:
- managing of publication of said application and subscription to said application by said subscriber;
- managing of the availability of said application based on authorization by said network operator and said application provider, comprising the step of managing of an availability state, for said application, having a value signifying one of a range of progressively wider deployment availabilities wherein said value is selected from a first pre-determined set by the network operator and from a second pre-determined set by the application provider; and managing of relaying and translating of said messages via the message gateway based on information from said subscription management module and said application management module.

10. The computer-readable program product of claim 9, the stored computer program further to perform the step of:
gathering of measurements on the demand for and utilization of said application;
wherein, said measurements being used in determining said value and in determining when to select said value.

* * * * *